(No Model.) 2 Sheets—Sheet 2.
T. PETERSON.
VAULTING HORSE.
No. 450,186. Patented Apr. 14, 1891.
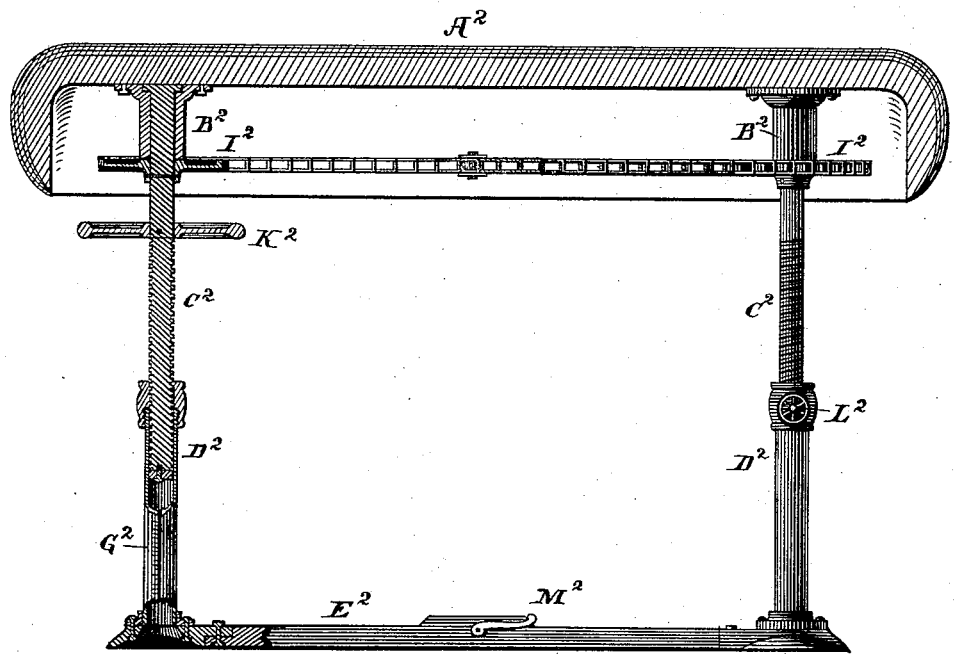
Fig. 6.
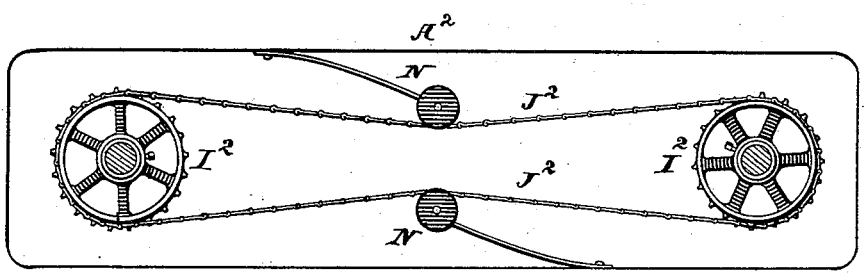
Fig. 7.
WITNESSES
F. H. Stuart
C. E. Humphrey
ATTORNEY 
INVENTOR
Theodore Peterson, by
C. P. Humphrey

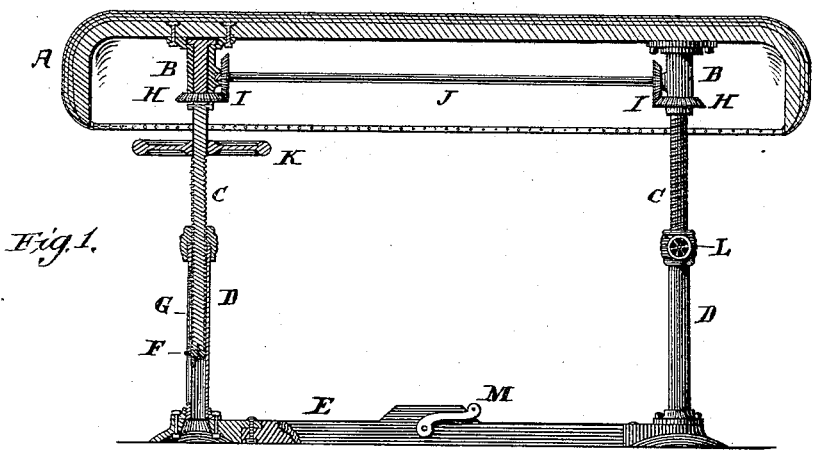
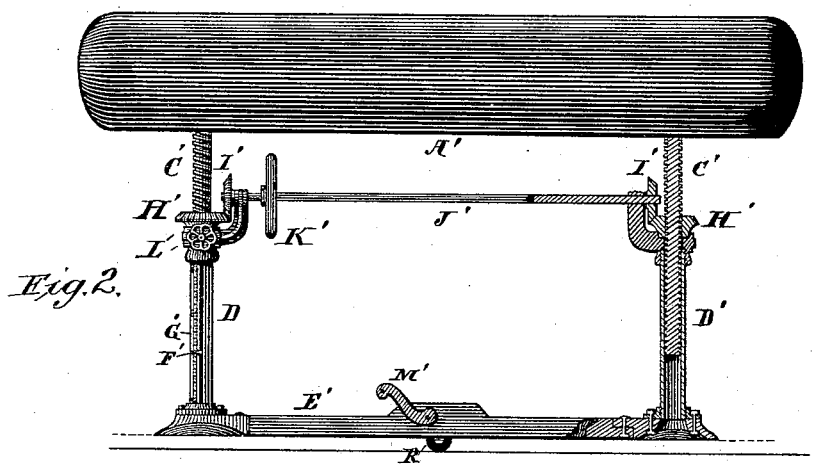
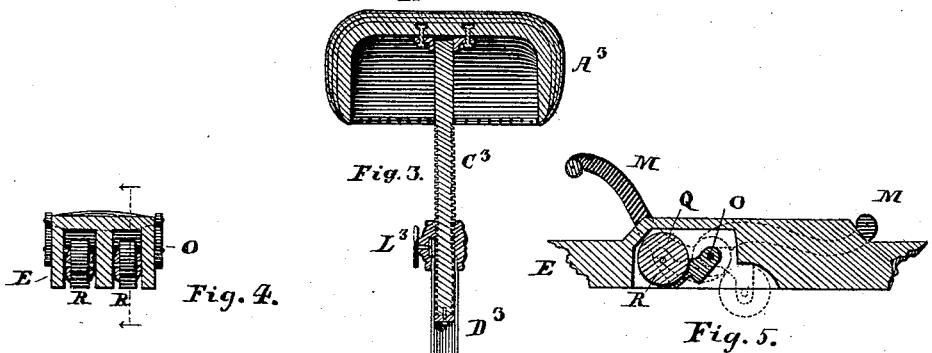

UNITED STATES PATENT OFFICE.

THEODORE PETERSON, OF AKRON, OHIO, ASSIGNOR TO THE HOWARD MANUFACTURING COMPANY, OF SAME PLACE.

VAULTING-HORSE.

SPECIFICATION forming part of Letters Patent No. 450,186, dated April 14, 1891.

Application filed October 22, 1890. Serial No. 368,893. (No model.)

*To all whom it may concern:*

Be it known that I, THEODORE PETERSON, a citizen of the United States, residing at Akron, in the county of Summit and State of Ohio, have invented a certain new and useful Improvement in Horses and Bucks for Gymnastic Exercises, of which the following is a specification.

The object of my invention is to produce a new horse and buck for gymnastic exercises and to provide improved means for their vertical adjustment.

To the aforesaid object my invention consists in the peculiar and novel construction and combination of parts hereinafter described, and then specifically claimed, reference being had to the accompanying drawings, which form a part of this specification.

In the accompanying drawings, in which similar letters of reference indicate like parts, Figure 1 is a longitudinal vertical central section of one form of my improved horse, a part of the base and one support being shown in elevation; Fig. 2, a side elevation of the same, showing a modified arrangement of the vertically-adjusting mechanism; Fig. 3, a central vertical section of a buck embodying my invention; Figs. 4 and 5, enlarged details of the cam-roller for elevating the base; Fig. 6, a modification of Fig. 1, showing different means for simultaneously operating the vertically-adjusting screws; and Fig. 7, an inverted plan of the horse shown in Fig. 6 to further exhibit the actuating mechanism shown in Fig. 6.

Referring to the construction shown in Fig. 1, A is the body of the horse, which does not differ essentially from the forms in common use, and consists of a shell, preferably of wood, of any desired length, rounded on the top and ends and open beneath and having an external padded covering. Attached to the inside of this shell A are sockets B, of the form shown, arranged to receive and form bearings for ends of screw-threaded vertical shafts C, having T-heads, by which they are retained in the sockets. The shafts C are arranged to enter oppositely-disposed vertical hollow posts D through internally-screw-threaded caps, which posts are mounted on a base E, and in one of which is a vertical slot through which extends a short arm attached to one of the shafts C, bearing an indicating-finger F, arranged to pass along a graduated scale G. Attached to or formed on the exterior of the post, keyed to each shaft C, are bevel gear-wheels H, meshing in which are similar gear-wheels I, mounted on a shaft J, which is journaled in bearings in the sockets B, thus placing the mechanism in the interior of the body of the horse, so that it will not come in contact with the person using it. Mounted on one of the shafts C and sufficiently below the lower edge of the body A to permit it to be readily reached with the hand is a hand-wheel K, by which, through the medium of the gear-wheels just referred to, the shafts C are simultaneously revolved in the same direction to raise or lower the body A to any desired height indicated by the finger F, when they are held by a set-screw L, provided with a suitable hand-wheel.

In the modified construction shown in Fig. 2, and in which the similar or equivalent parts are represented by the letters heretofore used having prime-marks, the screw-threaded shafts C' are rigidly attached to the body A', the gear-wheels H' are internally screw-threaded, and are revolubly mounted in bearings on the posts D' and turned by bevel-gears I', mounted on a shaft J', which is journaled in bracket-bearings supported by the posts D', and on which is a hand-wheel K', the desired height being indicated by the finger F' on the scale G', and the parts retained by the set-screw L'.

In the modified form shown in Figs. 6 and 7, and in which the similar or equivalent parts are represented by the letters of reference heretofore used having the exponent 2, the construction is similar to that shown in Fig. 1, except that for the bevel-gears H I and shaft J are substituted sprocket-wheels $I^2$ and chain $J^2$, the tension of the latter being maintained by pulleys N, mounted on springs attached to the inner sides of the body $A^2$.

In each of the modifications shown in Figs. 1, 2, and 6 there is preferably a device for elevating the base of the horse, enlarged details of which are shown in Figs. 4 and 5, and as the parts do not differ in the several views are indicated by the same letters of reference.

This device consists of two rocking levers M, mounted on a short shaft O, journaled in a recess in the base E, between which is a pivot Q, eccentric to the shaft O, on which are mounted rollers R, the parts being so arranged that when the levers are thrown back, as shown in Figs. 1 and 6, the rollers R retreat into the recess and permit the base E to rest on the floor; but when thrown forward, as shown in Fig. 2, they extend below the base and constitute casters on which the machine may be readily and easily moved, their progress forward being arrested by notches in the levers which encounter a shoulder in the recess, and thereby afford a firm support, as shown in Fig. 5.

The application of this invention to a "buck" is illustrated in Fig. 3, in which the reference-letters are marked with the exponent 3, and in which $A^3$ is the body, $C^3$ the screw-threaded shaft, $D^3$ the hollow post, $E^3$ the base, and $L^3$ the set-screw. In this construction the screw is rigidly attached to the body, as in the form shown in Fig. 2; but the other mechanism is unnecessary, as the screw is actuated by revolving the body.

I do not confine my invention to the exact proportions or arrangement of parts shown in the accompanying drawings, as these will of necessity differ, according to the requirement in each case; nor do I claim, generally, devices for vertically adjusting the horse, as I am aware that means for that purpose have already been used; but

What I claim, and desire to secure by Letters Patent, is—

1. In an exercising apparatus of the kind designated, the combination of a body having screw-threaded shafts projecting therefrom, hollow posts attached to a common base and arranged to receive said shafts and provided with screw-threaded caps, and means, such substantially as shown, for simultaneously operating said shafts and caps, substantially as shown and described.

2. The combination of the body A, shafts C, posts D, having screw-threaded caps, bevel gear-wheels H I, shaft J, and hand-wheel K, all constructed and arranged substantially as shown and described.

3. The combination, with the screw-threaded shaft and the hollow post arranged to receive it, and having a vertical slot and a graduated scale, of an index-finger attached to and arranged to move with said shaft and indicate the elevation on said scale, substantially as shown and described.

In testimony that I claim the above I hereunto set my hand.

THEODORE PETERSON.

Witnesses:
C. E. HUMPHREY,
C. P. HUMPHREY.